United States Patent
Kennedy, Jr.

(10) Patent No.: US 10,496,727 B1
(45) Date of Patent: Dec. 3, 2019

(54) WEIGHTED PANELS AND PANEL GROUP FOR RESPONSIVE DESIGN SYSTEM

(71) Applicant: Vinyl Development LLC, Miami Beach, FL (US)

(72) Inventor: Thomas R. Kennedy, Jr., Miami Beach, FL (US)

(73) Assignee: Vinyl Development LLC, Miami Beach, FL (US)

( * ) Notice: Subject to any disclaimer, the term of this patent is extended or adjusted under 35 U.S.C. 154(b) by 0 days.

(21) Appl. No.: 15/233,072

(22) Filed: Aug. 10, 2016

(51) Int. Cl.
  *G06F 16/958* (2019.01)
  *G06F 3/0482* (2013.01)
  *G06F 16/954* (2019.01)
  *G06F 17/22* (2006.01)

(52) U.S. Cl.
  CPC .......... *G06F 16/958* (2019.01); *G06F 3/0482* (2013.01); *G06F 16/954* (2019.01); *G06F 17/2247* (2013.01)

(58) Field of Classification Search
  CPC ............... G06F 3/0482; G06F 17/2247; G06F 17/30873; G06F 17/3089; G06F 17/30905
  See application file for complete search history.

(56) References Cited

U.S. PATENT DOCUMENTS

| | | | | |
|---|---|---|---|---|
| 6,300,947 | B1 * | 10/2001 | Kanevsky | G06F 17/30905 707/E17.121 |
| 6,966,028 | B1 * | 11/2005 | Beebe | G06F 17/3089 707/E17.116 |
| 7,143,342 | B1 * | 11/2006 | Baweja | G06F 17/30905 707/E17.121 |
| 7,337,392 | B2 * | 2/2008 | Lue | G06F 17/30905 707/E17.121 |
| 8,533,628 | B2 * | 9/2013 | Rohrabaugh | G06F 9/4443 715/200 |
| 2003/0110234 | A1 * | 6/2003 | Egli | G06T 3/4092 709/217 |
| 2003/0137540 | A1 * | 7/2003 | Klevenz | G06F 9/4443 715/762 |
| 2004/0103371 | A1 * | 5/2004 | Chen | G06F 17/30905 715/205 |
| 2006/0242578 | A1 * | 10/2006 | Van Steenbergen | G06F 17/24 715/700 |
| 2006/0288278 | A1 * | 12/2006 | Kobayashi | G06F 17/212 715/209 |

(Continued)

*Primary Examiner* — Eric J. Bycer
(74) *Attorney, Agent, or Firm* — Fish & Richardson P.C.

(57) ABSTRACT

Methods, systems, and apparatus, including computer programs encoded on computer storage media, for a responsive user interface. One of the methods includes receiving a page, the page including panels, each panel having an equivalent predetermined size. The method includes receiving a layout for the page, the layout defining a predefined hierarchy of panel groups that defines a visual relationship between the panel groups. The method includes selecting panels to include in a slide based on characteristics of the user device and the panel groups. The method includes determining a scaled size for each panel in the selected panels based on a relative weighting of the panel groups. The method includes resizing a panel in the set of panels based on the scaled size. The method includes generating the slide using the set of panels including the resized panel. The method includes sending the slide to the user device.

21 Claims, 19 Drawing Sheets

(56) References Cited

U.S. PATENT DOCUMENTS

| | | | | |
|---|---|---|---|---|
| 2007/0130525 | A1* | 6/2007 | Murphy | G06F 17/30905 715/747 |
| 2007/0150821 | A1* | 6/2007 | Thunemann | G06F 9/4443 715/762 |
| 2007/0204220 | A1* | 8/2007 | Petrov Nickolov | G06F 17/30905 715/234 |
| 2007/0271522 | A1* | 11/2007 | Son | G06F 9/4443 715/762 |
| 2012/0278704 | A1* | 11/2012 | Ying | G06F 17/2247 715/243 |
| 2013/0145252 | A1* | 6/2013 | Lie | G06F 17/30 715/234 |
| 2014/0203999 | A1* | 7/2014 | Shim | G06F 3/1454 345/2.2 |

\* cited by examiner

WEIGHTED PANELS AND PANEL GROUP FOR RESPONSIVE DESIGN SYSTEM

BACKGROUND

This specification relates to graphical user interfaces.

Creating web pages for a variety of form factors has become a necessity. The range of devices was extended from desktop computers to smartphones and tablets as well. The devices have a wide range of screen sizes. People expect web pages to load smoothly and be ascetically appealing. An attractive web page will hold the attention of a user better than an unattractive or awkwardly loaded one.

SUMMARY

In general, one innovative aspect of the subject matter described in this specification can be embodied in methods that include the act of receiving a page, the page including panels, each panel having an equivalent predetermined size. The method includes the act of receiving a layout for the page, the layout defining a predefined hierarchy of panel groups that defines a visual relationship between the panel groups. The method includes the act of selecting panels to include in a slide based on characteristics of the user device and the panel groups. The method includes the act of determining a scaled size for each panel in the selected panels based on a relative weighting of the panel groups. The method includes the act of resizing a panel in the set of panels based on the scaled size. The method includes the act of generating the slide using the set of panels including the resized panel. The method includes the act of sending the slide to the user device.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The scaled size of each panel may be determined at least in part based on the size of a parent group and a relative weighting between each panel in the parent group. The scaled size of each panel may be further determined based on a relative weighting between the parent group and other panel groups having the same parent as the parent group. Generating the slide may include calculating a first number representing panels that can be displayed horizontally, and a second number representing panels displayed vertically on the user device. The methods may include the act of generating slides, such that each panel on the page is included in one slide. The methods may include the acts of receiving, by the user device, one or more slides including the slide, each slide including at least one panel, displaying a first slide of the slides on the user device, and displaying a different slide of the slides on the user device in response to receiving a navigation action.

Particular embodiments of the subject matter described in this specification can be implemented to realize one or more of the following advantages. An appropriate amount of information is provided to the device. The user experience with web content is improved. Development costs are reduced. A single version of a web document can be used for a multitude of different user devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system described below can customize the presentation of content based on the size of the viewing screen, thereby enabling a single version of the content to be attractively presented across all types of user devices. Different user devices have screens of differing sizes (e.g., a smart watch versus a tablet computing device). Content that is designed for one device may not be suited to another device. For example, text designed to be displayed on a 22-inch monitor may appear excessively small when presented on a smart phone. Similarly, an image designed for a smart phone may look pixelated when presented on the 22-inch monitor. A web page designed to a tablet may include excessive white space when presented on a computer monitor.

Instead of creating a single web page for presentation on a computer, the system uses a series of standard smaller panels. The system selects which panels to present based on the content that has already been displayed, the content that remains to be displayed, the size of the screen of the user device, etc.

Figure 1:
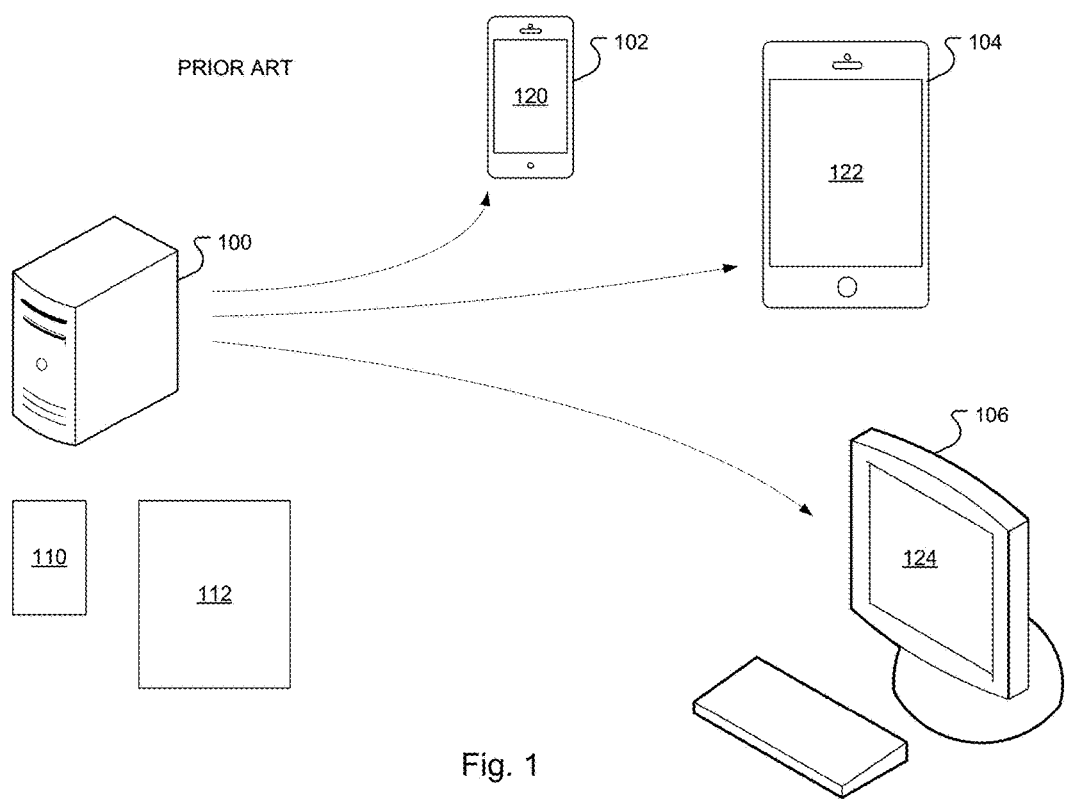
FIG. 1 illustrates a traditional content distribution system that provides content to different user devices.

FIG. 1 illustrates a conventional content distribution system for different user devices. A webserver 100 provides content to different user devices. For example, a user on a smartphone 102, a user of a tablet 104, and a user of a personal computer 106 may each request a webpage from the webserver 100. Each of these user devices include display characteristics that are employed to present the webpage or other asset of interest. For example, a typical smart phone has a screen size of less than 5 inches, measured along the diagonal expanse of the screen. A typical tablet computing device may have a screen size that ranges, for example, from 6 inches to 11 inches or more. A typical monitor of a personal computer may have a screen size from 11 inches, for a small laptop, to 40 inches or more. At the same time the resolution provided by each type of device is similarly different. For example, a smart phone may provide resolution up to 720×1280 pixels, a tablet may provide up to 2560×1600 pixels, and a monitor may provide up to 3840× 2160 pixels. Different screens may provide for different pixel density (pixels/inch). As a further complication, some smart phones and tablets can dynamically change the page-orientation of their display, e.g., from portrait to landscape, depending on the orientation that the user holds the device.

In general, a webpage is a document that is suitable for transmission over a network (for example, the World Wide Web) and display on a web browser. A webpage may include hypertext, scripts, etc. and may potentially interact with programs embedded in the web browser (for example, plug-ins). Typical web pages provide hypertext that can include navigation to other web pages via hyperlinks, often referred to as links.

On a network, a web browser being executed by a user device can retrieve a web page from a remote web server. The web server may restrict access to only a private network, such as a corporate intranet, or it provides access to the World Wide Web. A web browser may request a web page from a web server using a request sent over the network, for example a Hypertext Transport Protocol (HTTP) request.

A static web page is delivered exactly as stored (as web content in the web server's file system) while a dynamic web page is generated by a web application that is driven by server-side software or client-side scripting. Dynamic web pages help the web browser (the client) to enhance the web page through user input to the server.

To provide a good user experience of devices of different screens, a traditional system may provide different versions of a single web page. For example, a mobile version 110 of a webpage may be provided for presentation on a smart phone 102. A full html version 112 of the webpage may be provided for presentation on the tablet of the personal computer. The mobile version 110 is generally smaller than the full html version 112 in order to accommodate the smaller screen on mobile devices. Generally, each version of the webpage has to be developed and tested separately.

Web pages designed for one screen size are not as attractive and usable when presented on a screen of a different size. Generally, a webpage is designed to be presented in a particular user interface having an orientation, size and aspect ratio. Forcing the web page to fit into a user interface for which it was not designed can reduce the quality of the presentation. For example, designed to generally remain in a static position a typical monitor of a personal computer predominately presents one display orientation (e.g. landscape), while a user interface for a tablet can adapt for multiple orientations (e.g., landscape, portrait, etc.) depending on user preference. A webpage that is designed to be presented in one orientation may not be suitable for presentation in another. For example, designed for landscape may require a scroll bar in portrait or a web page designed to be presented in a portrait view may include borders on either side which contain no content when displayed on a landscape user interface.

Similar to orientation other physical characteristics of the display can affect the quality of the user experience. For example, a web page designed to be presented on a 21 inch monitor may be illegible if presented on a 9 inch tablet. User interface displays may also have different aspect ratios. For example, some have a 4:3 ratio (i.e. four units of width for every three units of height), while others present content in a 16:9 (i.e. 16 units of width for every nine units of height) or 16:10 ratio (i.e. 16 units of width for every ten units of height).

Because of the wide variety in orientation, size, and aspect ratio, traditional web page delivery and display systems inefficiently utilize the user interface of most devices.

Figure 2:
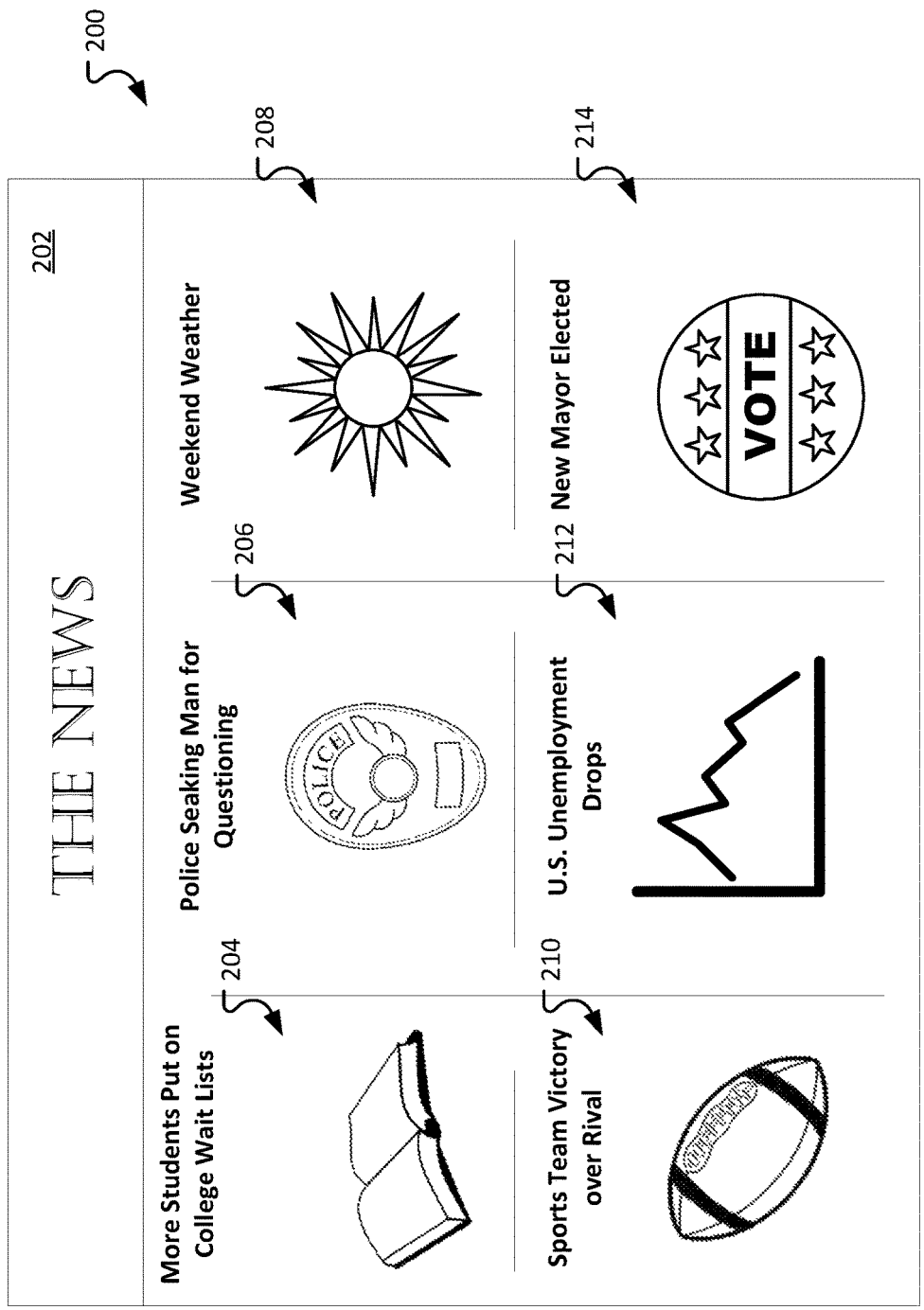
FIG. 2 illustrates an example of a web page.

Referring to FIG. 2, a typical webpage is illustrated that contains multiple portions that may be individual or on a whole effected by the display of the webpage on different user devices. In this example, the web page 200 is a web page for a local newspaper (i.e., "The News"). The web page 200 includes a header area 202 which presents the title of the web page. The web page also includes several stories each represented by a single graphic. The stories arranged in the columns: a story about college wait lists 204, a story about a sports team 210, a story about a man wanted by the police 206, a story about the unemployment rate 212, a story about the weather 208, and a story about the mayor election 214.

One or more techniques may be employed to represent the web page 200, for example the web page may be developed in advance, (e.g. a static web page) or may be constructed dynamically accord to rules and programs (e.g. JAVA SERVER PAGES, servlets, ACTIVE SERVER PAGES, etc.) A static web page does not change its content, however, a dynamic page may be programmed to change its content over time.

To provide content to different displays (e.g. displays having different sizes, resolutions, pixel density, orientations, and/or aspect ratios), a web server may keep multiple versions of the web page; for example, there may be one version of the web page that is delivered to traditional desktop web browsers and a second version of the web page that is delivered to web browsers on devices with a smaller form factor, such as a smart phone. Maintaining multiple versions of the web page increases the cost associated with delivering content. Each version of the web page has to be developed and tested. Any change to the web page needs to be replicated in each version of the web page.

The system described below provides a system where content for a web page can be developed once and then delivered to devices having different screen sizes. The system determines how much information to display on the user device and, when the available content exceeds the available screen size, provides easy navigation between the content. Content is created within panels of predetermined size. A page is made up of one or more panels. Based on the size of the display of a user device one or more panels can be selected to be displayed on the user device. The panels that are selected to be displayed together are referred to as a slide.

Figure 3:
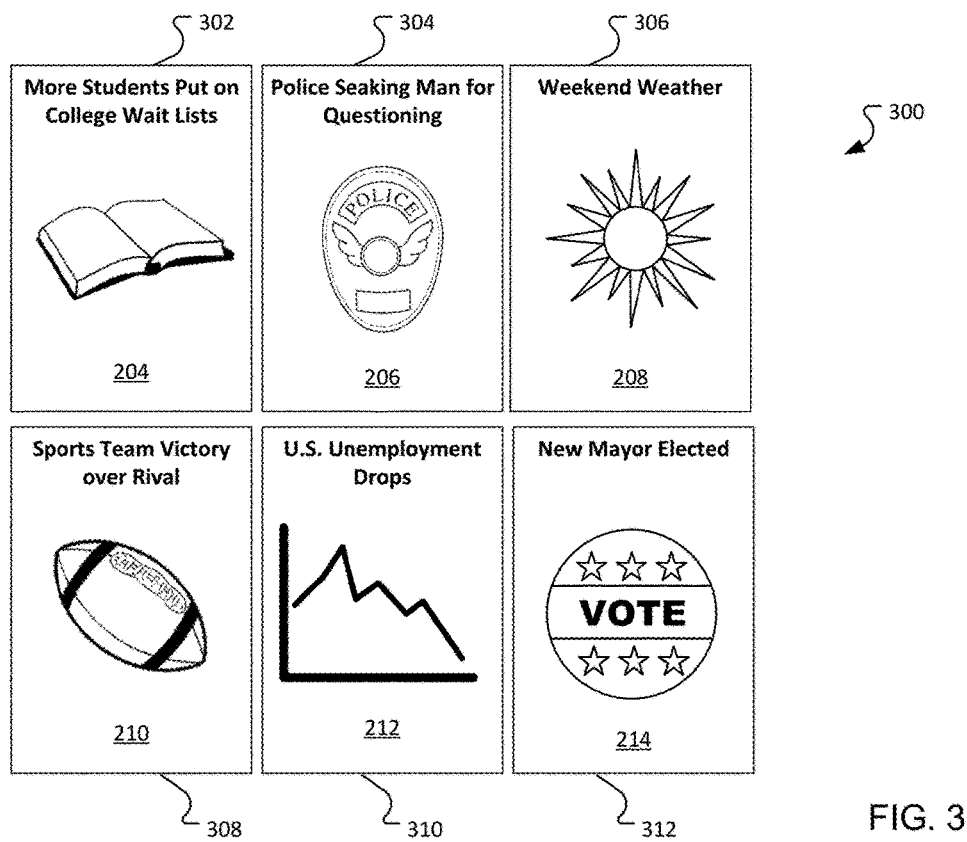
FIG. 3 illustrates an example page for providing content using panels.

Each panel can be considered a standard size user interface element that can display content on a user interface. For example, referring to FIG. 3, content for a page is divided into panels. In general, a panel contains content to be presented to the user. In this example, the content of the web page 200 of FIG. 2 has been placed into panels. A panel 302 includes the story about college wait lists 204, the panel 304 includes the story about a man wanted by the police 206, the panel 306 includes the story about the weather 208, the panel 308 includes the story about a sports team 210, the panel 310 includes the story about the unemployment rate 212, and panel 312 includes the story about the mayor election 214.

As shown above, a single web page may include several panels of content. The panels may be a collection of rows of data, or it may be a single record of data. It can be formatted in a structured way, such as tabular (in both a horizontal tabular format and a vertical tabular format), or it may be unstructured in a user-defined custom format. A panel can contain any possible html content.

The size of a panel can be selected so that any screen that is designed to display web content will display at least one panel (that is, any given user interface will display at least a single panel). The panel can be thought of as atomic units of content that can be presented on a user device.

Once created panels can be combined and displayed on different user devices having different displays. A panel only needs to be created once and then it can be used by different user devices that have different display characteristics while maintaining a high quality user experience. Because each panel only needs to be created once, the cost of delivering content to users is reduced, the cost of maintaining the content is similarly reduced, and the quality of the user experience is improved.

Figure 4:
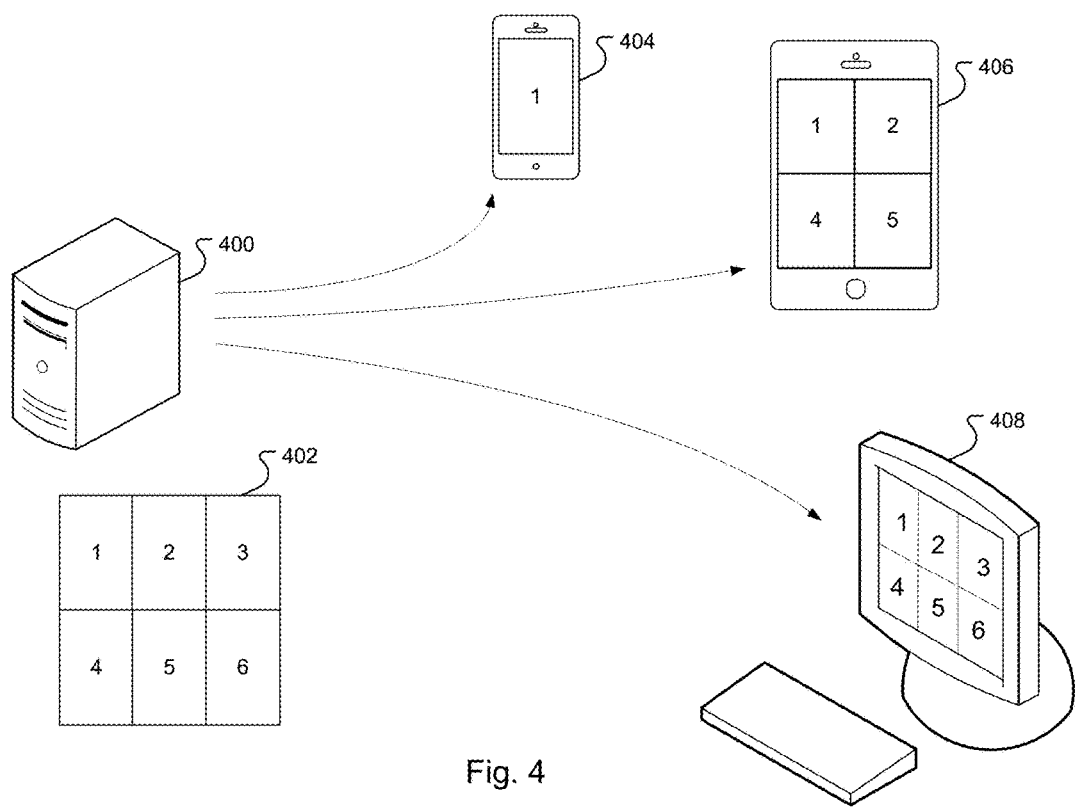
FIG. 4 illustrates an example of providing different slides to different user devices.

FIG. 4 illustrates an example of providing different slides to different user devices. A user interface of a user device may be capable of displaying more than one panel at a time. The system can select multiple panels to display simultaneously on the user device. These panels are combined together into a slide, and the slide is presented on the user device. In general, the size of a panel is predetermined based on the size of the slide, the number of panels that will fit on the slide, and a configurable relative size parameter for the panel. In contrast, the size of the slide is dependent on the size of the display on the user device.

The web server sends different slides to different devices. For example, a small user device with a relatively small-sized display (for example a smart phone 404) may be capable of displaying one or relatively few (e.g. one of the six panels) and therefore receives a relatively small slide. A medium size user device (for example a tablet 406), may display more than a few panels (e.g. four of the six panels) and therefore receives a medium size slide. A large user device (for example the personal computer 408) may display all six of the panels and therefore receives a large slide. Customizing each slide to the separate user devices provides a good user experience to all devices.

Slides can be sent to a user device either singularly or in groups. In some implementations, the webserver only provides the user device one slide at a time. The slide includes the panels that the user device is instructed to display. In other implementations, the web server 100 sends all of the slides to display the page to the user device when the page is requested. For example, the webserver may send all the panels and information the organizes the panels into slides.

In some implementations, client-side software (for example, an independent application, a plug-in, or a script (such as JAVASCRIPT)) on the user device can segment and present the appropriate slides to the user of the device. The software may be embedded in the requested page or sent in one or multiple additional files. In other implementations, the web server 100 can send the panels to the user device and the client side software on the user device can generate the slides dynamically.

The web server may deliver panels in parallel to sending slides. The slides received by the client is may be a collection of a panel identifier, a panel visibility indicator (which describes whether or not a panel is be presented), a width of the panel (as a percentage), a height of a panel (as a percentage), a panel X position, and a panel Y position.

When a slide is delivered to a client it may not contain panel data or content. This mechanism increases the efficiency of the presentation because, in response to a user resizing their browser (or changing the orientation of the screen), the server can send new slides, which are new positions heights, etc. The content of the panels remains on the client and does not need to be resent.

From an end user perspective, a slide is a collection of panels.

Figure 5:
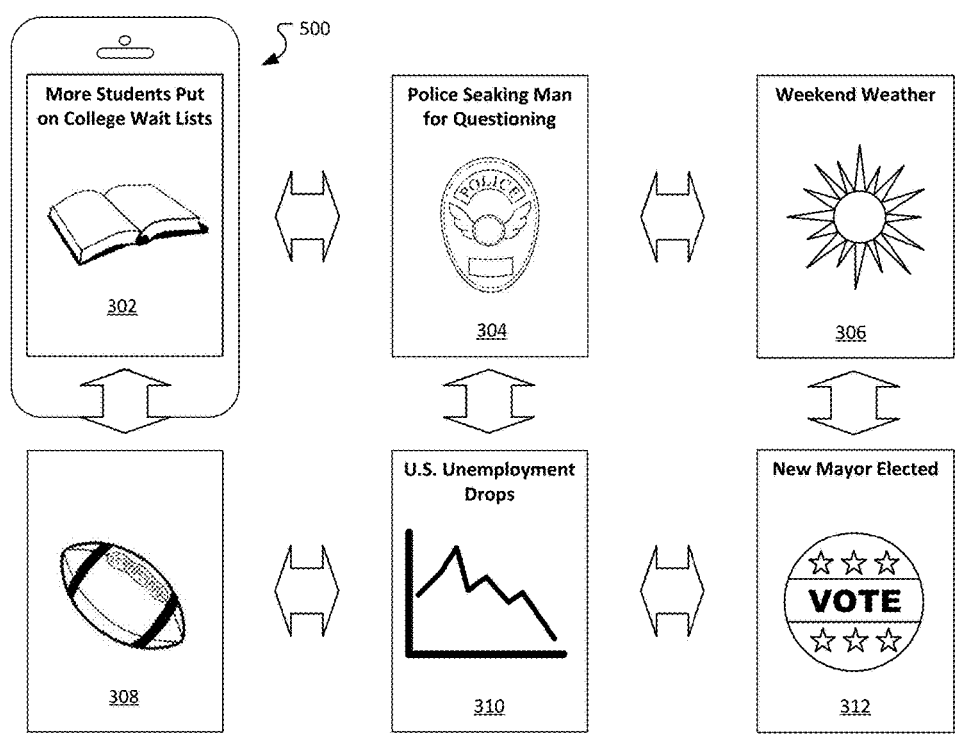
FIG. 5 illustrates navigating between slides on a user device.

Referring to FIG. 5, when a page is delivered to a user device, it includes the ability to navigate between slides. In this example, a smart phone 500 displays a slide that includes a single panel: panel 302 that includes the story about college wait lists. The user may navigate between the sides, for example, by interacting with the device (e.g., by selecting a link, swiping the touch sensitive screen, etc.). Using these navigation techniques, the user can cause different slides to be presented. In this example, the user can navigate to a slide that includes panel 304, a slide that includes panel 306, a slide that includes panel 308, a slide that includes panel 310, and a slide that includes panel 312 to be displayed. In some implementations, navigation may be limited to a left/right navigation in which, for example, panel 308 is located to the right of panel 306. In some implementations, navigations may be in any direction. The software remembers the slide a user is on if they leave the page, when they come back to the page, they are directed to the same slide.

Figure 6:
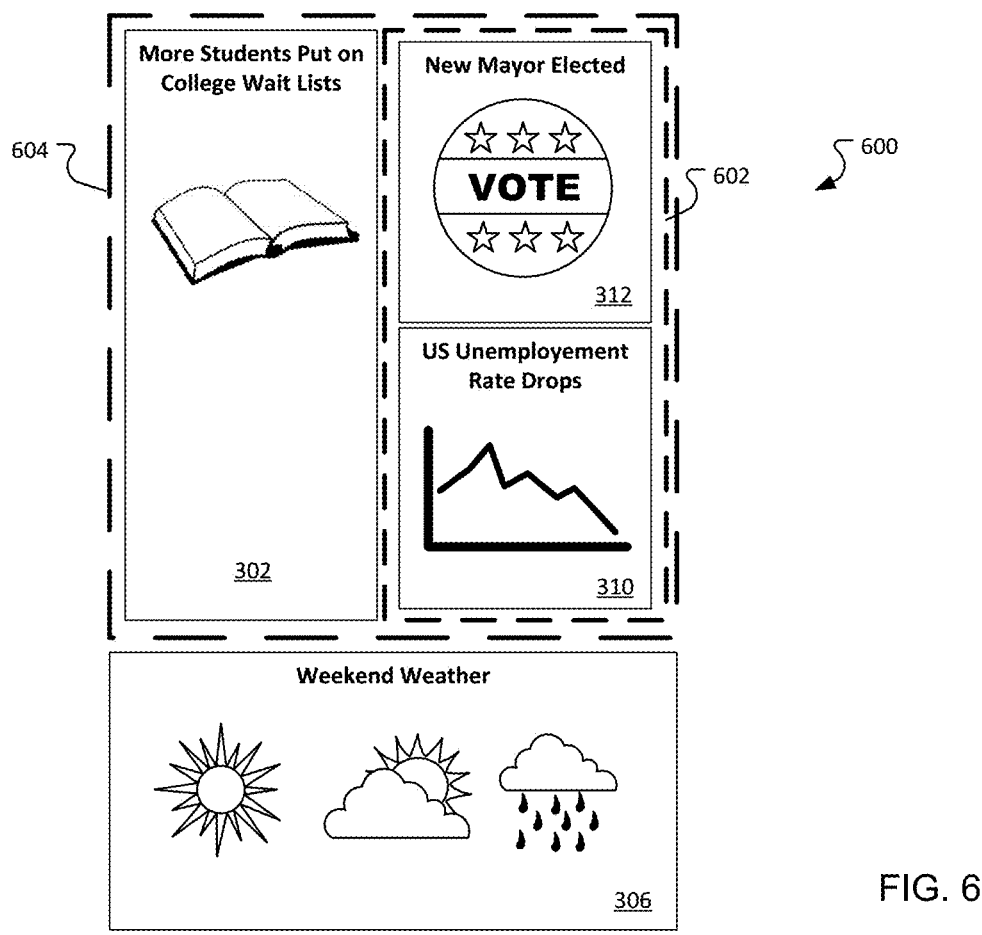
FIG. 6 illustrates an example of a page that includes panels organized by a layout.

FIG. 6 illustrates an example of a page that includes panels organized by a layout 600. In addition to panels, a page may also include a layout. The layout of a page defines how panels should be displayed when they are all visible on the screen. For example, some panels may be stacked vertically (panel 302 is above panel 306) while some panels might be stacked horizontally (panel 302 is to the left of panel 312). Panels may also be grouped such that panel 312 can be above panel 310 while both panels are to the right of panel 302.

In this example, panel 312 is positioned above panel 310. Panel 312 and panel 310 make up group 602. Panel 302 is beside group 602. Panel 302 and group 602 make up group 604. Group 604 is positioned above panel 306.

Figure 7:
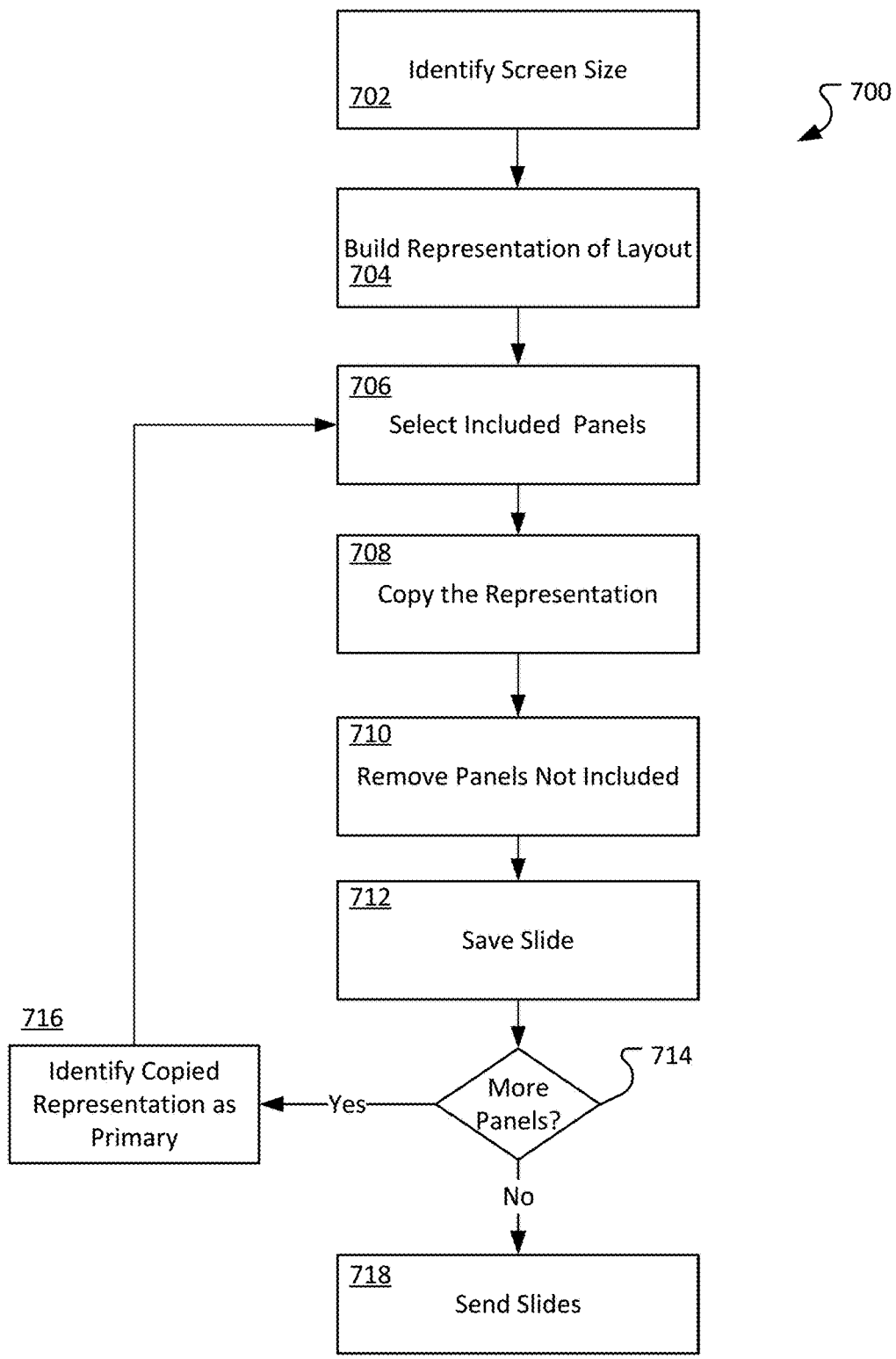
FIG. 7 is a flow chart for an exemplary process for generating slides from a page.

FIG. 7 is a flow chart for an exemplary process 700 for generating slides from a page. The process can be performed by one or more computing devices each include one or more processors and memory. The operations of the process can be performed on a single computing device or may be distributed across multiple computing devices. The production of slides can occur on a web server or other server-side computing device, or may be performed by the user device, as discussed above. In some implementations, the process may be initiated, for example, in response to a request for a page to be delivered to the user device. In some implementations, the process may be initiated by the delivery of a page to the user device. The process may be initiated when a user resizes their client, such as a browser on a desktop or rotating a smart phone. The process may be initiated in response to other stimuli.

The process determines the display characteristics (e.g. size) of the display of the user device 702. General sizing information may be provided by the user device. For example, the user device may provide the number of pixels the screen can display. In some implementations, the process calculates the number of lines (vertical and horizontal) of text that can appear on the screen. The size of a panel can be measured using the number of characters that can be displayed on the panel. For example, a standard panel may be 18 characters high and 24 characters wide. That is, a panel may be designed to display 18 lines of text, each line including 24 characters. As many fonts are proportional (e.g., the font includes characters of varying widths), the width of a character may be determined to be the width of the widest character in a predetermined font. Alternatively, the size of the panel is determined using a pre-determined non-proportional font, which uses a single standard width for all characters. In some implementations, a portion of the screen may be reserved for the presentation of a banner, menu, or other information. For example, a header including "The News" may be displayed regardless of the current slide.

To determine the number of panels that can be displayed on the user device, the process determines a height for a panel on the user device. In some implementations, the height of the panel may be determined using the formula:

$$\text{Panel Height} = \text{Lines of Text} \times \text{Character Height in Pixels} \quad (1)$$

For equation 1, panel height is the minimum height of a panel in pixels, lines of text is the number of lines of text included in a standard panel, and character height in pixels is the height of a character in pixels. In some implementations, the height of a character in pixels may be dependent on information provided from the user device. For example, the user device may provide preferred font and font size information.

The process also determines the width for a panel on the user device. In some implementations, the width of the panel may be determined using the formula:

$$\text{Panel Width} = \text{Characters in Line} \times \text{Character Width in Pixels} \quad (2)$$

For equation 2, panel width is the minimum width of a panel in pixels, characters in line is the number of character included in a line of text in the standard panel, and character width in pixels is the determined width of a character in pixels. In some implementations, the width of a character in pixels may be dependent on information provided from the user device. For example, the user device may provide preferred font and font size information.

In some implementations, the lines of text and characters in line values may be predetermined constants (for example, 18 and 24 respectively).

The process determines a maximum number of vertical panels for a slide. In some implementations, the maximum number of vertical panels can be determined using the formula:

$$\text{Vertical Panels} = \text{Screen Height}/\text{Panel Height} \quad (3)$$

For equation 3, vertical panels is the maximum number of panels that can be displayed vertically on the user interface, screen height is the height of the user interface in pixels, and panel height represents the minimum panel height as calculated using equation 1, above. In some implementations, the vertical panels value is rounded down to the nearest whole number. For example, if the formula above determines that 2.1 vertical panels can be displayed on the user interface of the user device, the process may assign the value 2 to the vertical panels.

Similarly, the process determines a maximum number of horizontal panels. In some implementations, the maximum number of horizontal panels can be determined using the formula:

$$\text{Horizontal Panels} = \text{Screen Width}/\text{Panel Width} \quad (4)$$

For equation 4, horizontal panels is the maximum number of panels that can be displayed horizontally on the user interface, screen width is the width of the user interface in pixels, and panel width represents the minimum panel width as calculated using equation 2, above. In some implementations, the horizontal panels value is rounded down to the nearest whole number.

In some implementations, the number of vertical panels has a minimum value of 1. In some implementations, the number of panels that can be displayed (horizontally or vertically) is rounded down to the nearest integer. In other implementations, the system may be adjustable to support partial panels, as discussed below.

The process builds 704 an in memory representation of the layout. The layout can include all panels that are not currently part of a slide. The representation can be, for example, a data structure (e.g. a tree, a string) that identifies different panels and groups. For example, referring again to FIG. 6, the layout 600 may be represented by the string "(Panel 302:(Panel 312/Panel 310))/Panel 306." In this representation, the parenthetical denotes a group and the forward slash denotes that the panels are located vertically; that is, one panel or group above the other panel or group. The colon is used to denote panels that are located horizontally; that is, one panel or group is next to the other panel or group.

The process 700 selects 706 included panels. Based on the size of the screen as calculated above, the process identifies the maximum number of panels that can be included on a slide. In some implementations, the process selects panels starting at the top of the layout. The process may select panels to preserve the layout. For example, if the user interface can display 1 horizontal row of panels and 2 vertical columns of panels, the process will first select panels that are presented side by side. Selected panels may be denoted in the representation using one or more characters (for example, an asterisk). For example graphically illustrated in FIG. 6, the process determines to present Panel 302 and Panel 312 on the user device. The process updates the representation to indicate that Panel 302 and Panel 312 have been selected. For example, the process may identify the selected panels using an *, such as "Panel 302*: (Panel 312*/Panel 310))/Panel 306." Examples describing techniques for selecting panels are described further below.

In some implementations, the process may determine that partial panels may be displayed on the screen. For example, the system may be able to compress some panel to fill an available area when a user device is capable of displaying a non-integer number of panels (e.g. two and half panels).

The process 700 copies 708 the representation.

The process 700 removes 710 panels that are not included in the slide from the representation. The process 700 then lays out the panels that are included in the slide. For example, referring to FIG. 6, the process may remove Panel 310 and Panel 306 from the representation. It will then lay out the remaining panels ensuring that they will be provided 100% of the available space.

The process 700 saves 712 the slide. The process stores a slide that includes the panels for delivery to the user device. For example, the system may store the remaining representation if the process determines to include Panel 302 and Panel 312 in the slide, the process removes the remaining panels from the model "Panel 302: Panel 312" In some implementations, the model can be saved as a slide. In some implementations, grouping information and flagging information are removed from the representation before it is saved as a slide. In other implementations, the process generates a slide using the model information; for example, the process can generate an HTML page that includes the selected panels.

The process 700 determines 714 if there are any panels not included in a slide. For example, the process can examine the copy of the representation and determine if there are any panels that have not been flagged.

If there are unselected panels, then the process 700 identifies the copied representation as the primary 716. In some implementations, the process can remove panels that have already been included in a slide. For example, given the representation "Panel 302*: (Panel 312*/Panel 310))/Panel 306", the process 700 may remove "Panel 302*" and "Panel 312*" from the representation. The process 700 may update the grouping information, removing groups that include zero or one panel. In this example, the new representation may be "Panel 310/Panel 306." Subsequently, the process 700 may continue with step 706 as described above.

Once all of the panels on the page have been included in a slide, the process 700 sends 718 the slides to the user device.

Figure 8:
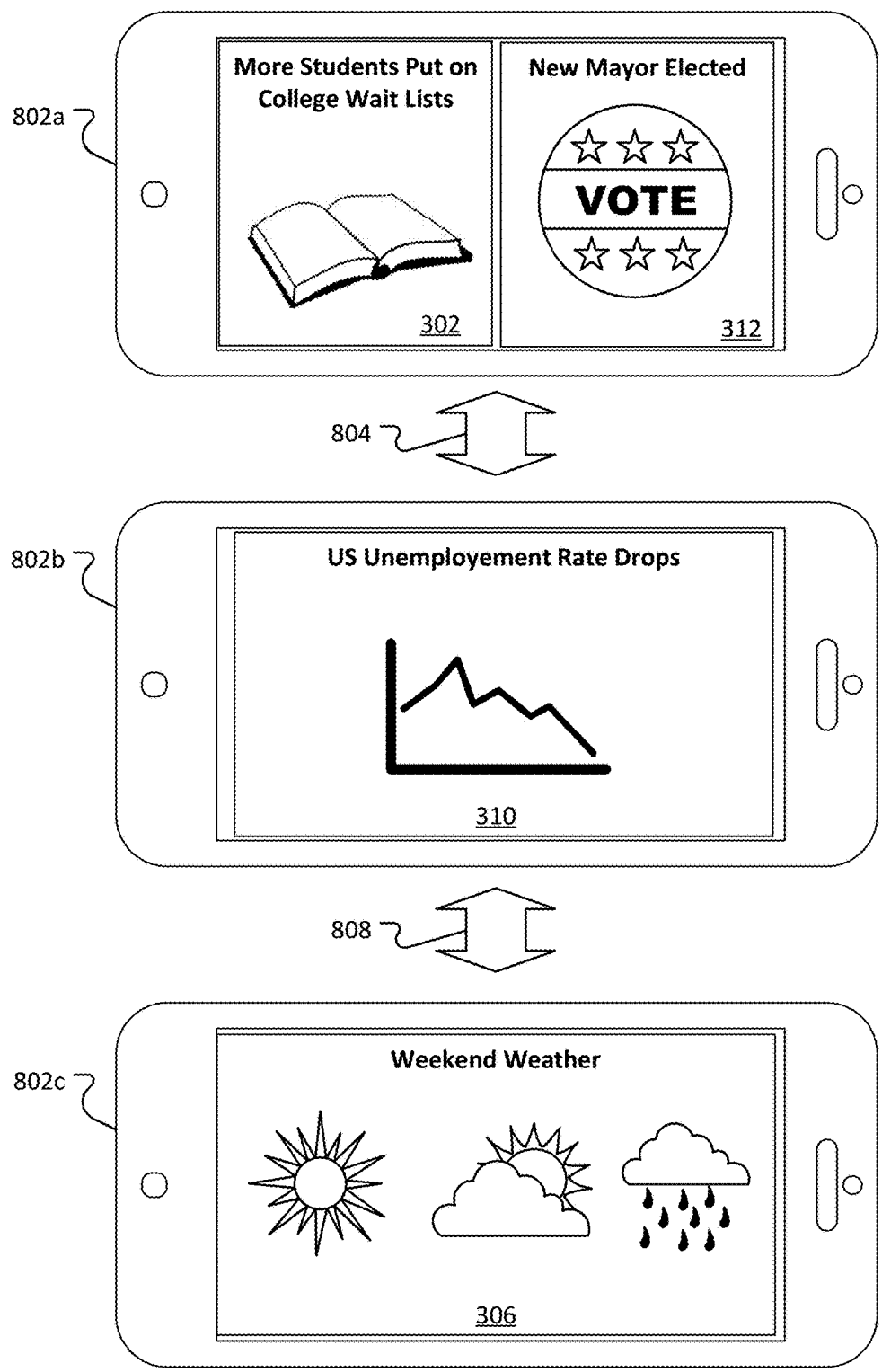
FIG. 8 illustrates an example of delivering slides to a user device.

FIG. 8 illustrates an example of presenting multiple slides individually presented on a user device. The example illustrates presenting the layout described on FIG. 6 on a device that can display one row of panels and two columns of panels (1×2).

As described above, the layout of FIG. 6 may be described using a representation:

(Panel 302: (Panel 312/Panel 310))/Panel 306

Starting at the upper left of the layout, the system selects panel 302 and panel 312 to include on the first slide (as shown in the user interface of the smart phone 802a). Panel 302 is selected because it is in the first panel in the representation (that is, the left-most panel in the above). Panel 312 is selected because it can be positioned next to panel 304 horizontally. Once the first slide has been selected, the remaining slides can be described using the representation:

Panel 310/Panel 306.

The representation indicates that panel 310 should be presented above panel 306. As the user interface can only display a single row of panels, the next slide includes only panel 310 (as shown on the user interface of the smart phone 802b). Panel 310 is selected because it is in the left most position of the representation. However, because there are no panels that can be positioned next to panel 310, horizontally, panel 310 is presented alone on the slide. In some implementations, the panel 310 may be expanded to fit the available space on the user interface. Once the second slide has been selected, the remaining slides can be described using the representation:

Panel 306.

The final slide includes panel 306 as shown on the user interface of the smart phone 802c. In this example, smart phone 802a-c represents a single smart phone presenting different slides, as described above. Users can navigate between the slides, for example by using a swipe motion, following links, or other navigation method. In some implementations, as represented by double arrows 804 and 808, navigation may be bi-directional. A user may navigate from a first slide to a second slide though one navigation methods (for example, a left swipe) and may navigate from the second slide to the first slide using another navigation method (for example, a right swipe). A user can also navigate to any slide on the page through an action bar. So, if there are 10 slides and the user knows they want the last one, they can navigate directly to it.

Figure 9:
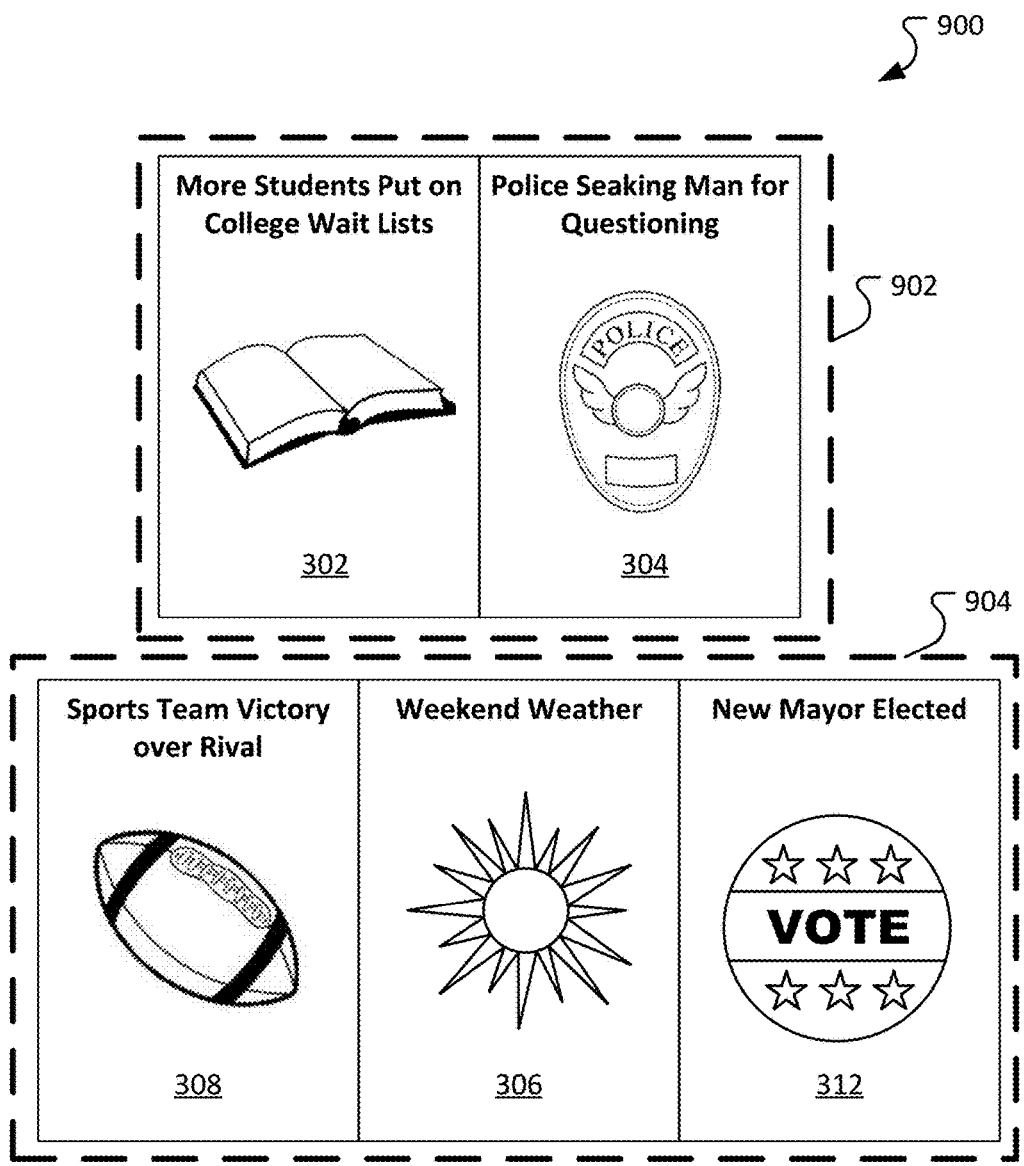
FIG. 9 illustrates a layout of panels.

FIG. 9 illustrates a different layout 900 of panels. As described above, the layout determines how panels are arranged in slides. Different presentations can be created with the same slides by altering the layout. The layout 900 for the page includes two groups with the first group 902 positioned above the second group 904. The first group 902 includes the panel 302 and the panel 304 positioned horizontally. The second group 904 includes the panel 308, the panel 306, and the panel 312 all positioned horizontally. Using the representation notation described above the layout made the described using the string:

(Panel 302: Panel 304)/(Panel 308: Panel 306: Panel 312)

Figure 10:
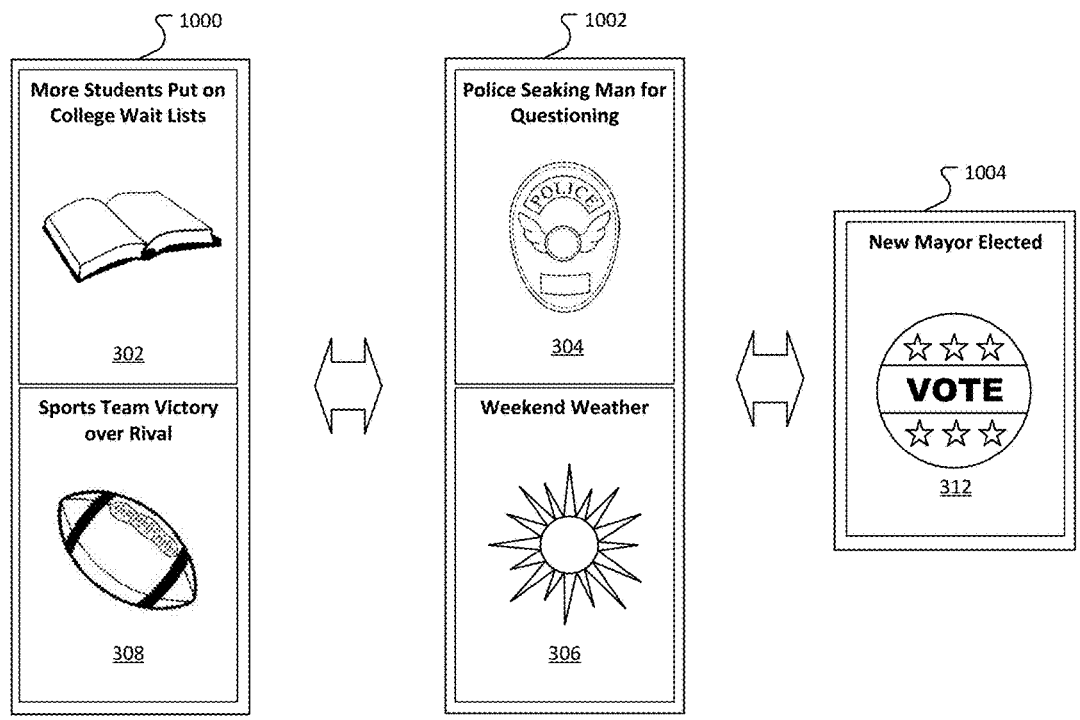
FIG. 10 illustrates an example of delivering slides to a user device.

FIG. 10 illustrates an example of slides generated for presentation on a user device based on the layout 900 of FIG. 9. In this example, the user device requesting the page can display two rows of panel of panels (2×1).

To generate the first slide 1000, the system selects the first panel (the leftmost panel) in the representation (in this case panel 302). The system identifies the leftmost panel that can be presented beneath panel 302 (in this example, panel 308). The system then generates a first slide 1000 including panels 302 and panel 308. After the slide 1000 is generated, the representation may be represented using the string representation:

Panel 304/(Panel 306: Panel 312)

To generate the second slide 1002, the system selects the first panel (the leftmost panel) in the representation (in this case, panel 304). The system identifies the leftmost panel that can be presented beneath panel 304 (in this example, panel 306). The system then generates a second slide 1002 including panels 304 and panel 306. After the slide 1002 is generated the representation may be represented using the string:

Panel 312

To generate the third slide 1004, the system selects the first panel (the leftmost panel) in the representation (in this case, panel 312). As there are no other panels remaining in the representation, panel 312 is included alone in the third slide 1004.

Figure 11:
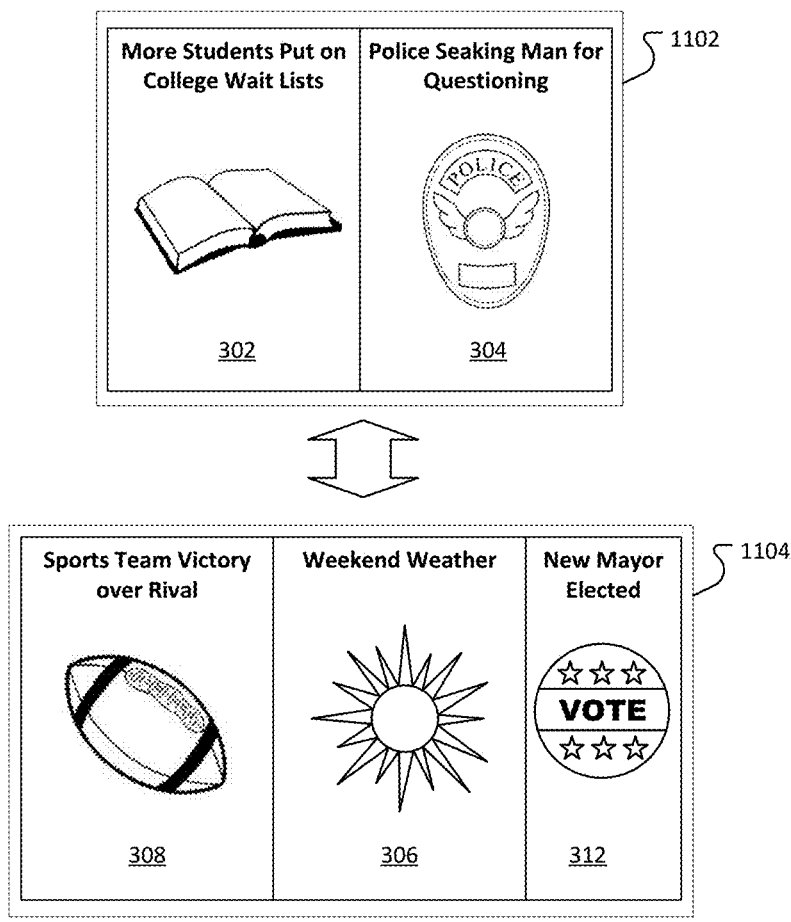
FIG. 11 illustrates an example of delivering slides to a user device.

FIG. 11 illustrates another example of delivering slides to a user device based on the layout 900 of FIG. 9. As described above, in some scenarios, a user device may be able to display partial panels. For example, a user device may be capable of displaying one row of panels and two and a half columns of panels.

As discussed above, the layout 900 of FIG. 9 may be described using the string.

(Panel 302: Panel 304)/(Panel 308: Panel 306: Panel 312)

To generate the first slide 1102, the system selects the top left panel in the representation. The system identifies the leftmost panel that can be presented to the right of panel 302 (in this example, panel 304). The system then generates a first slide 1102 that includes panels 302 and panel 304. The system determines that the user device can present a half a panel; however, as no panel can be presented to the right of panel 304, the system does include any additional panel. During presentation of the user device, the panels 302 and 304 may be expanded to fill the available display area of the user device.

After the slide 1102 is generated, the representation may be represented using the string representation:

(Panel 308: Panel 306: Panel 312)

To generate the second slide 1104, the system selects the first panel (the leftmost panel) in the representation (in this case, panel 308). The system identifies the leftmost panel that can be presented to the right of panel 308 (in this example, panel 306). The system identifies the leftmost panel that can be presented to the right of panel 306 (in this example, panel 312). However, because the user device can only display half of a panel, the system determines whether the panel 312 can be compressed sufficiently to fit into the available space. The process for compressing a panel to fit into a compressed space is discussed further below.

In this example, the system determines the panel 312 can be compressed to fit into the available space on the user device. The system then generates a second slide 1104 including panels 308 and panel 306, and compressed panel 312. After the slide 1104 is generated the representation may be represented using the string:

308: 306: 312

As discussed further below, in some implementations, a slide or group in a layout may be identified as having a larger or smaller relative size. In some implementations, the layout may indicate if a slide is large, regular, small, or tiny. For example, a '++' may indicate a large panel, a '+' may indicate a regular panel, a '-' may indicate a small panel, and a '—' may indicate a tiny panel.

Figure 12:
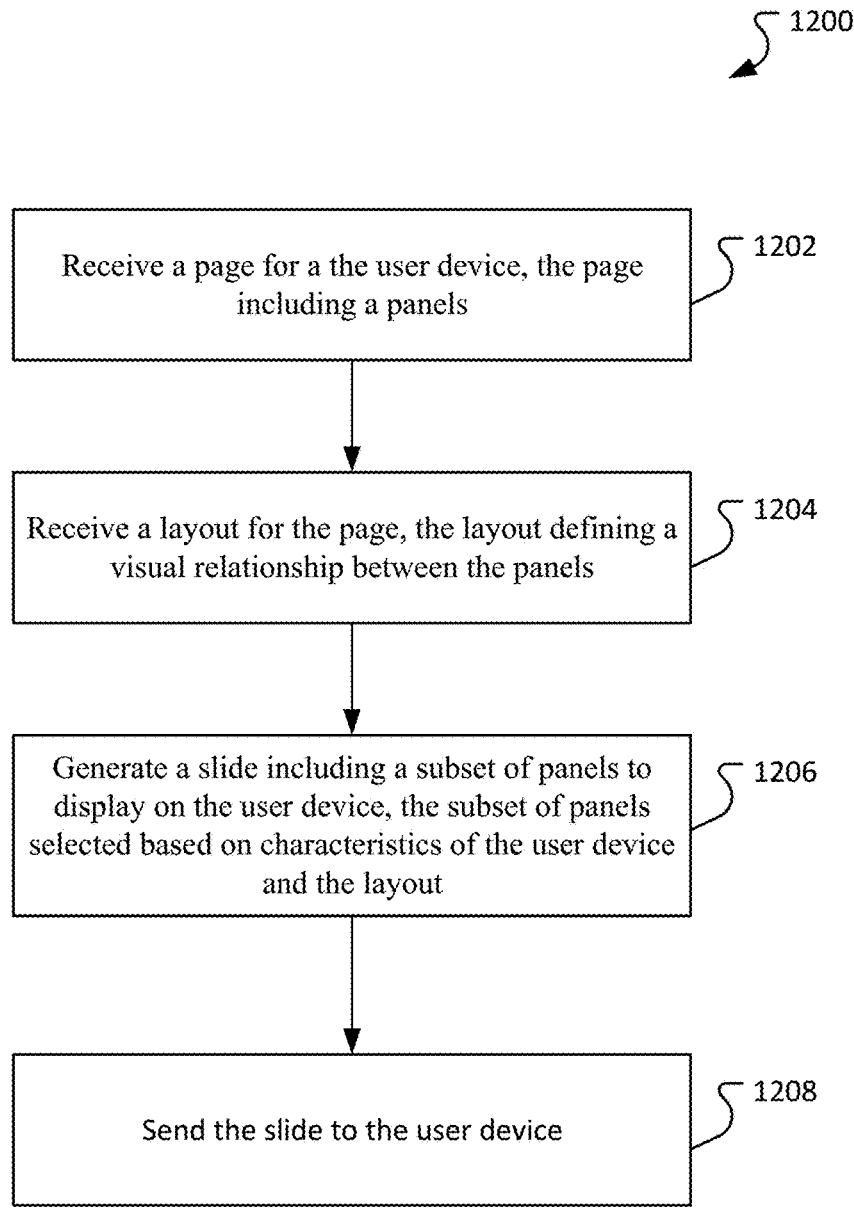
FIG. 12 is a flow chart of an example process for delivering slides to a user device.

FIG. 12 is a flow chart of an example process 1200 for delivering slides to a user device. The process can be performed by a computer system including a processor and memory. For example, the process may be performed by a web server or a computer system working in conjunction with a web server.

The process 1200 obtains 1202 a page. The page may be requested by a user device (for example, a smart phone, tablet, or other personal computing device, including but not limited to a personal computer). The user device may request the page using, for example, an HTTP request sent over a network (for example, the Internet). The page can be included in, for example, an HTML page. The page can be stored in persistent data storage (for example, in one or more files stored on a file system, in a document management system, or in a database). The page may also be located in temporary storage (for example, an in-memory cache).

The process 1200 obtains 1204 a layout. The layout describes a visual relationship between the panels. For example, one panel may be above another panel. One panel may be next to another panel. The layout may also include groups. The group describes a visual relationship between panels in the group. In some implementations, groups may be nested within groups. A group may be treated identically to a panel within the higher level layout or group.

The process 1200 generates 1206 a slide. Slides can be generated using, for example, the process 700 described above with respect to FIG. 7.

The process 1200 sends 1208 the slide to the user device. In some implementations, the process generates multiple slides and sends the multiple slides to the user device in the same response. For example, the process may generate sufficient slides so that each panel on the page is included in at least one slide. In some implementations, the process may generate sufficient slides so that each panel on the page is included in one and only one slide.

In some implementations, the relative display size of panels in a slide may be adjusted based on a relative size indicator of the panels and layout groups (collectively referred to as a panel-groups to include panels and/or groups).

Figure 13:
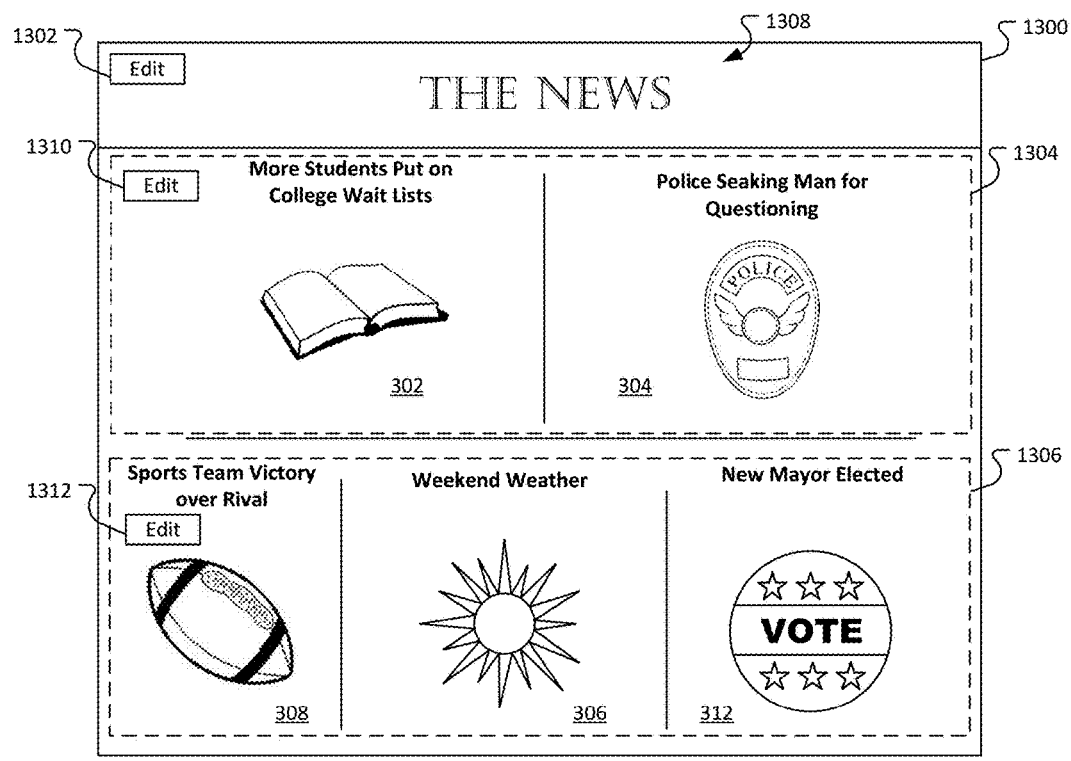
FIG. 13 illustrates an example of a development environment for developing a web page.

FIG. 13 illustrates an example of a development environment 1300 for developing a web page. The development environment may present a slide as it would appear on a user interface of the same size as the development environment 1300 (with the additions of edit controls described in more detail below). In some implementations, a developer may change the size of the development environment 1300 to replicate a larger or smaller user interface (and thereby adjusting the contents of the slide).

In the example, the development environment 1300 displays a header 1308, a top group 1304 including two panels 302 and 304, and a bottom group 1306 including three panels 308, 306, and 312. The development environment 1300 includes an edit button for each section of the web page, such as the header 1308, the top group 1304, and the bottom group 1306 that is not displayed as part of the web page outside the development environment 1300. The edit button 1302 enables editing of the header 1308. The edit button 1310 enables editing of the top group 1304. The edit button 1312 enables editing of the bottom group 1306.

This example shows the layout groups configured vertically on top of each other and the panels within the groups configured horizontally side by side. As described above, in other examples, layout groups may be configured vertically and/or horizontally. Similarly, panels may be configured either vertically and/or horizontally within a group. Further, while the slide displayed in the development environment 1300 is relatively simple for explanatory purposes, a layout group may also include one or more nested layout groups.

In some implementations, each layout group can include an attribute that determines whether panel groups within the layout groups are presented horizontally or vertically.

While the panels can be developed using predetermined identical sizes, the panels may be resized within a slide. In this example, the top layout group 1304 is the same size as the bottom layout group 1306 and the panels (panel 302, 304) within the top layout group are each of identical size. Similarly, the panels (panel 308, 306, 312) within the bottom layout group 1306 are each of identical size.

The scaled size of each panel can be determined based on the size of the user interface, the size of a parent group, and the number of panel groups within the group. For example, the panels 302 and 304 are scaled larger than the panels 308, 306, and 312. If the scaled size of each of the top layout group 1304 and the bottom panel layout 1306 group is 1200×400 pixels, then the scaled size of each of the panels 302 and 304 may be 600×400 and the scaled size of each of the panels 308, 306, and 312 may be 400×400 pixels.

In some implementations, panel groups may be scaled to be presented in different relative sizes as discussed further below.

Figure 14:
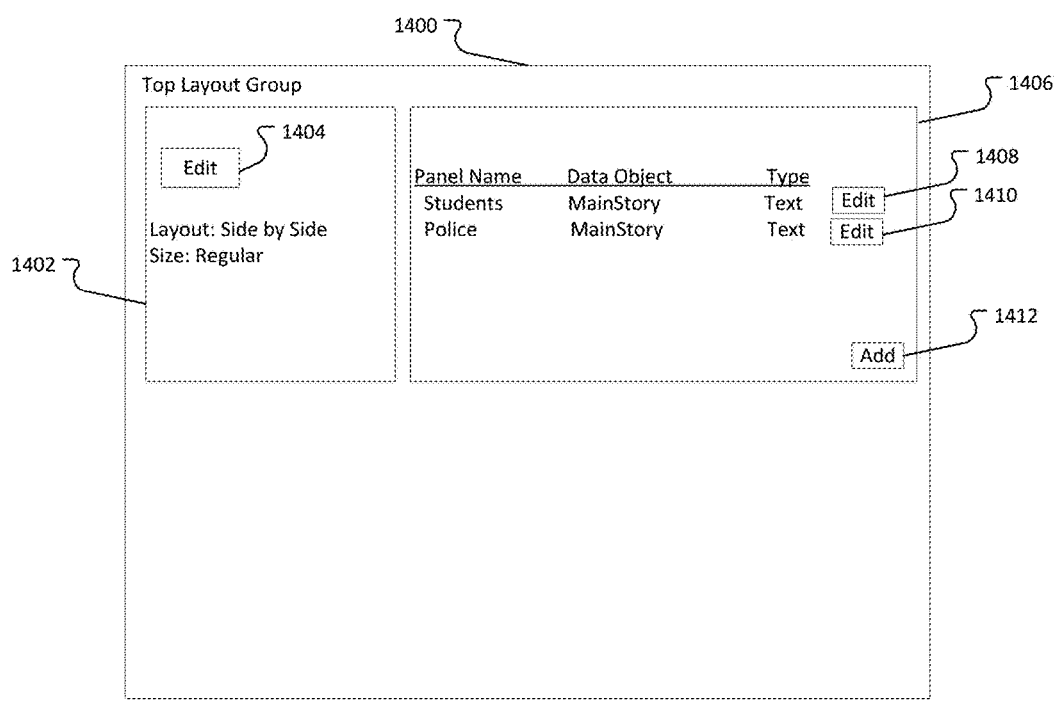
FIG. 14 illustrates a development environment for editing the characteristics of a layout group.

FIG. 14 illustrates a development environment 1400 for editing the characteristics of a layout group. The development environment 1400 may be reached by, for example, selecting the edit button 1310 of FIG. 3.

A first area 1402 of the development environment 1400 describes the characteristics of the top layout group. For example, the first area 1402 may specify that the layout organization within the layout group is side by side and that the size of the layout group is "regular". An edit button 1404 can allow a developer to alter these characteristics, as described below with respect to FIG. 17.

A second area 1406 lists the panel groups that are included in the layout group. In this example, the list identifies the students and police stories. While this example explicitly refers to the student and police stories, in some implementations, the panels may include dynamically generated content. For example, the students panel 302 of FIG. 3 may instead be referred to as a lead story panel that includes content that is dynamically obtained at runtime from a database, a content management system, or other data source.

The edit button 1408 can enable the developer to update information about the student panel. The edit button 1410 can enable the developer to update information about the police panel.

Figure 15:
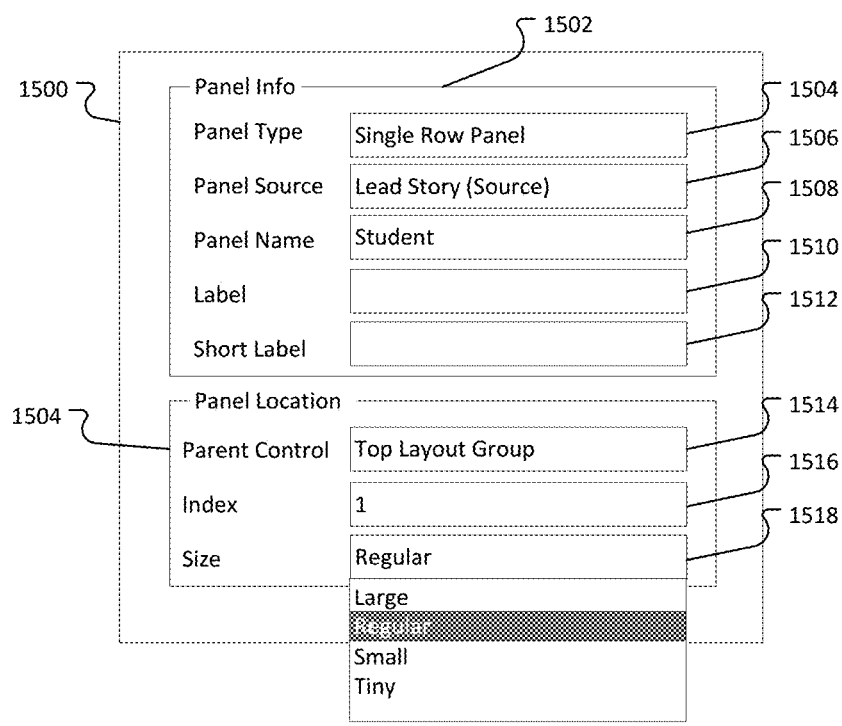
FIG. 15 illustrates a development environment for updating the characteristics of a panel.

FIG. 15 illustrates a development environment 1500 for updating the characteristics of a panel. A panel info area 1502 includes information about the panel. The panel type 1504 indicates the type of panel. A panel type may be, for example, a single row panel, a chart, a report, an image, a video, an advertisement, etc.

The panel info area 1502 may also enable a developer to identify a panel source 1506. The panel source 1506 can be an identifier that identifies the code for the panel. The panel source 1506 can also identify an object or other software code that can be used to generate the panel at run time. The panel source 1506 can also include an identifier used by a content management system, etc.

The panel area 1502 may enable the developer to provide a name 1508 for the panel (in this example, "Student"). The panel area 1502 may also enable the developer to provide a label 1510 and a short label 1512 for the panel. The label or short label may be displayed on a slide including the panel. In some implementations, the label or short label may be selected to be displayed based on the scaled size of the panel (as discussed further below).

The development environment 1500 may also include a panel location area 1504. The panel location area 1504 enables a developer to specify or identify information about the panel. A parent control 1514 specifies (and in some implementations enables the developer to change) the parent layout group for the panel. In this example, as seen on FIG. 13, the student panel is part of the top layout group. The index 1516 identifies the location of the panel within the parent layout group. In this example, the student panel is the first item in the layout group.

The panel location area 1504 can also enable the developer to display a relative size of the panel 1518. The size can identify a relative scaling factor for the panel when multiple panels are included on the same slide.

In some implementations, the relative size of different panel groups is determined from the top level layout down. Each panel group is allocated the space in the slide based on the relative scaling factor. Each child panel group allocates space within the parent based on the relative scaling factors. In some implementations, a developer may be able to enter a specific weighting factor (for example 1.25). In other implementations, the developer may be able to select from a predetermined number of different weighting factors. In one implementations, a selection of "Large" may correspond to a weighting of 1.25. A selection of "Regular" may correspond to a weighting of 1.0. A selection of "Small" may correspond to a weighting of 0.5. A selection of "Tiny" may correspond to a weighting of 0.25.

Once the size of the panel is determined, as it will be rescaled and displayed on the slide, the user interface can elect to display the label or the short label, depending on the scaled size of the panel. For example, if the panel is relatively small, the short label may be displayed. If the panel is relatively large, the label may be displayed.

In some implementations, the weighting of a panel group is used to determine the relative size of panel groups that share a common parent. For example, referring to FIG. 13 student panel 302 and police panel 304 share a common parent (layout group 1304). Sports panel 308, weather panel 306, and election panel 312 share a common parent (layout group 1306). And layout group 1304 and layout group 1306 share a common parent (the slide).

In some implementations, the weighting of a panel can be determined based on the weight of the panel and the weight of each of the ancestors of the panel.

Figure 16:
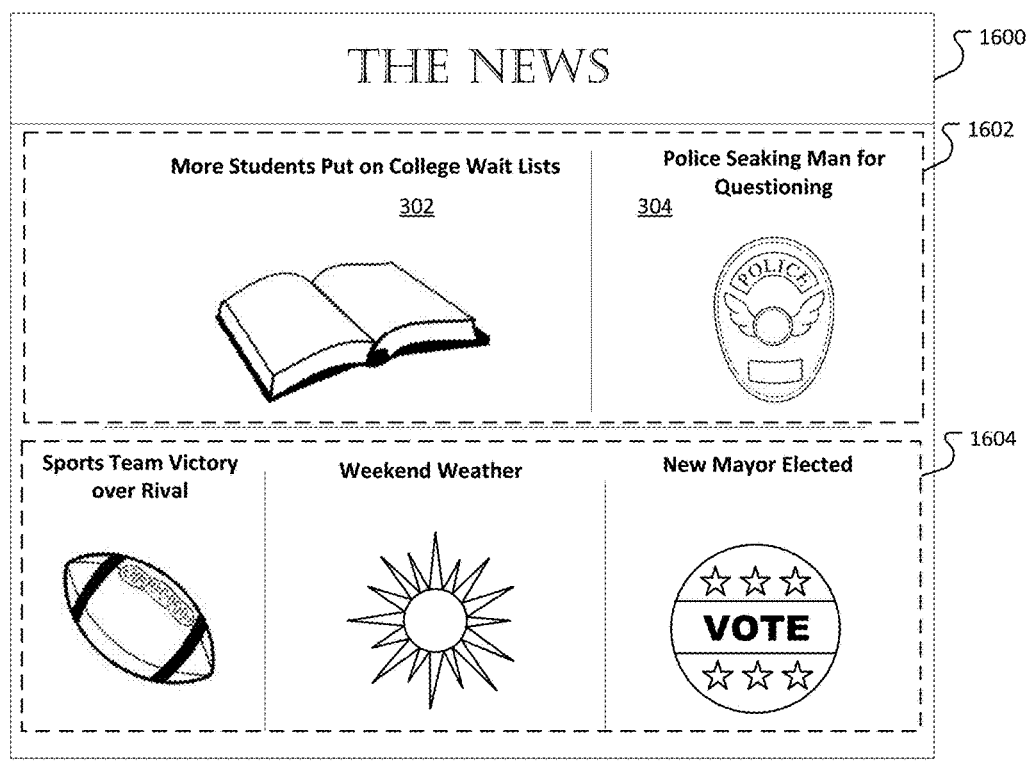
FIG. 16 illustrates a slide when the developer changes the size of the panels.

FIG. 16 illustrates a slide 1600 when the developer changes the size of the panels. As described above, the relative size of the panels can be determined based on a scaling factor. In this example, the student panel 302 has been changed to have a weighting of "Large" or 1.25 while the police panel 304 has been changed to have a weighting of "Small" or 0.5 so, therefore, the total weight of the panel is 1.75 (1.25+0.5=1.75). The student panel 302 is allotted 71% (1.25/1.75=0.714) of the area inside the top group 1602. While the panels are designed as identical in size, the panels can be rescaled to enable a wider variety of different presentations views.

The relative size between the top panel 1602 and the bottom panel 1604 remains unchanged.

Figure 17:
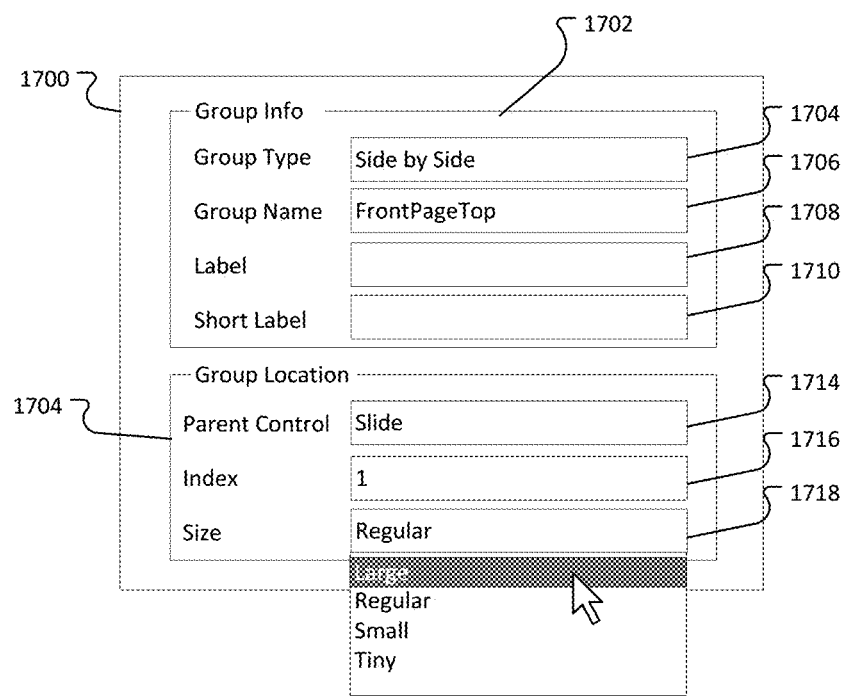
FIG. 17 illustrates a development environment for updating the characteristics of a layout group.

FIG. 17 illustrates a development environment 1700 for updating the characteristics of a layout group. A layout group info area 1702 includes information about the layout group. The group type 1704 indicates the type of group. The group type may indicate the orientation of panel groups within the group. For example, the group type may be side by side, top by bottom, etc.

The group info area 1702 may also enable a developer to identify a panel source. The group info area 1702 may enable the developer to provide a name 1706 for the group (in this example, FrontPageTop). The group info area 1702 may also enable the developer to provide a label 1708 and a short label 1710 for the group. The label or short label may be displayed on a slide, including the layout group. In some implementations, the label or short label may be selected to be displayed based on the scaled size of the panel (as described above with respect to labels on the panel).

The development environment 1700 may also include a group location area 1704. The group location area 1704 enables a developer to specify or identify information about the panel. A parent control 1714 specifies (and in some implementations enables the developer to change) the parent layout group for the group. In this example, the group is part of the top level of the slide. The index 1716 identifies the location of the group within the parent layout group. In this example, the "FrontPageTop" panel is the first item in the layout group.

The group location area 1704 can also enable the developer to display a relative size of the group 1718. The size can identify a relative scaling factor for the panel when multiple groups are included on the same slide (as described above).

In this example, the developer is changing the size of the layout group from "Regular" to "Large."

Figure 18:
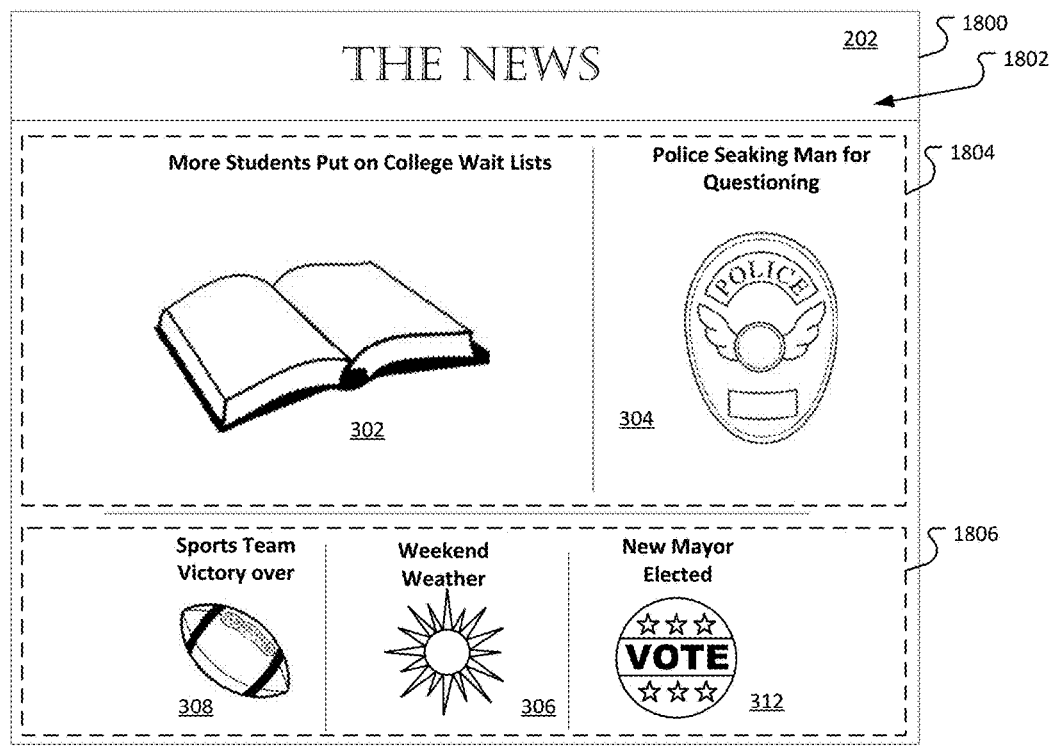
FIG. 18 illustrates a slide in which the developer changes the size of the layout groups.

FIG. 18 illustrates a slide 1800 when the developer changes the size of the layout groups. As described above, the relative size of the panels can be determined based on a scaling factor.

In this example, the developer has made further changes to the weightings described in FIG. 16. The top group 1804 has been changed to have a weighting of "Large" or 1.25 and the bottom layout panel 1806 has been changed to have a weighting of "Small" or 0.5 so, therefore, the total weight of the slide is 1.75 (1.25+0.5=1.75). The top layout group 302 is allotted 71% (1.25/1.75=0.714) of the area inside the panel (excluding the header 1802).

The relative size panels within the top and bottom group remains unchanged although the panels in the top group 1804 are larger and the panels in the bottom group 1806 are smaller.

Figure 19:
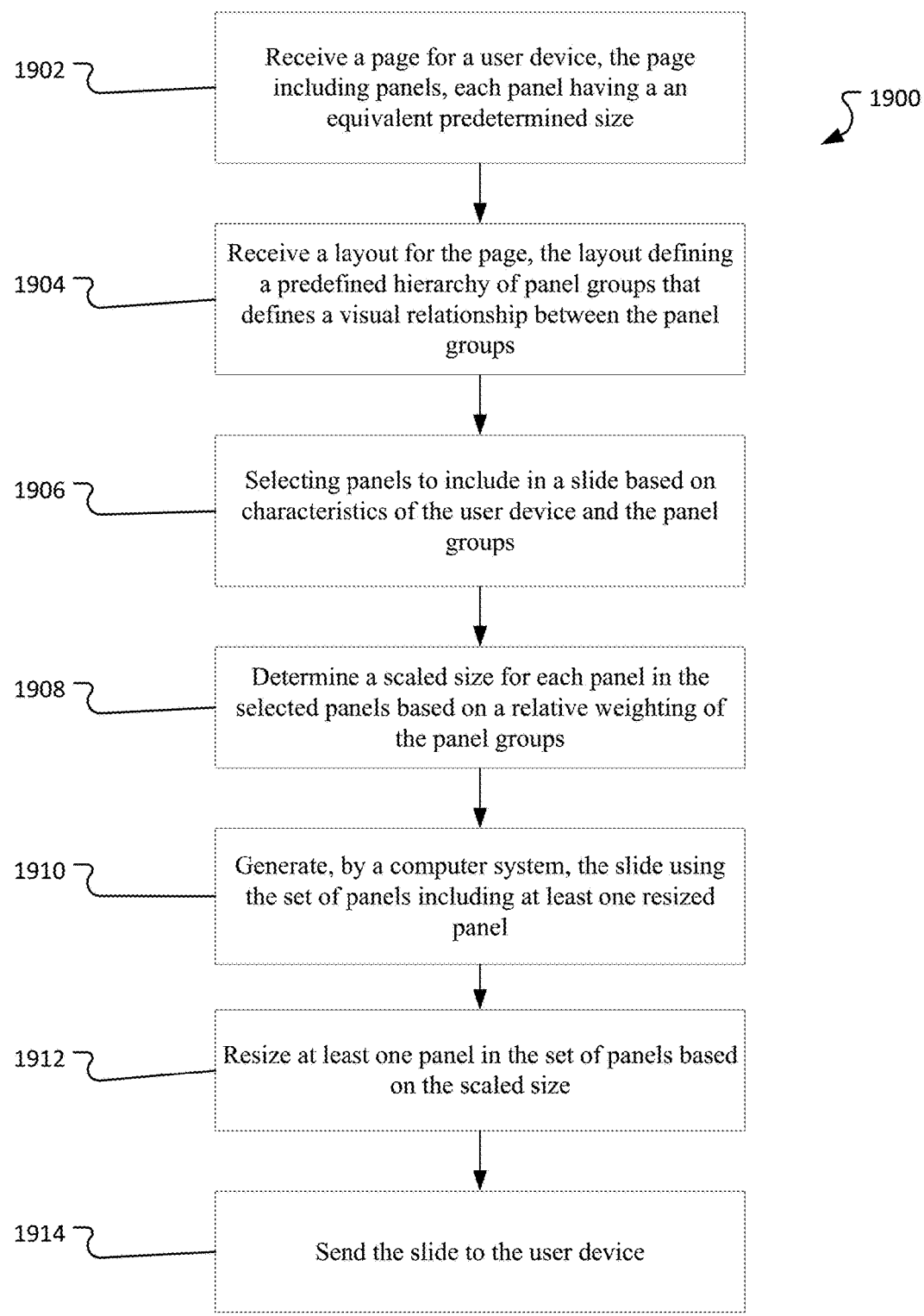
FIG. 19 is a flow chart of an example process for weighted panel groups for a responsive design system.

FIG. 19 is a flow chart of an example process 1900 for weighted panel groups for a responsive design system.

The process 1900 receives 1902 a page for a user device, the page including panels, each panel having a an equivalent predetermined size.

The process 1900 receives 1904 a layout for the page, the layout defining a predefined hierarchy of panel groups that defines a visual relationship between the panel groups.

The process 1900 selects 1906 panels to include in a slide based on characteristics of the user device and the panel groups.

The process 1900 determines 1908 a scaled size for each panel in the selected panels based on a relative weighting of the panel groups.

The process 1900 resizes 1910 at least one panel in the set of panels based on the scaled size.

The process 1900 generates 1912 the slide using the set of panels including at least one resized panel; and The process 1900 sends 1914 the slide to the user device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions), encoded on computer storage medium for execution by, or to control the operation of, data processing apparatus.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)), to name just a few. Devices suitable for storing computer program instructions and data include all forms of non-transitory computer-readable media and memory devices, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser). Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
   creating a page including a plurality of panels and a layout of the plurality of panels in a development environment, the development environment enabling a developer to determine how content is presented to different computer devices by:
   associating content with the plurality of panels;
   receiving data representing a weighting value for at least one panel of the plurality of panels, the weighting value specifying a size ratio of the at least one panel relative to another panel of the plurality, the size ratio being independent of a size of a display of a user device; and
   organizing the panels including the at least one panel and the associated content into a hierarchical layout that organizes the plurality of panels based on the weighting value associated with the at least one panel, the hierarchical layout indicative of an order for presentation of the panels and one or more types of navigation actions of a plurality of different navigation actions for navigating through the order of presentation of the panels;
   receiving a request to provide the page to the user device;
   selecting two or more panels to include in a slide based on the size of the display of the user device and the hierarchical layout, wherein the selected panels include less than all of the panels and the at least one panel;
   determining a scaled size for each panel in the selected panels based on the weighting value of the at least one panel and the size of the display of the user device, wherein a first scaled size of the at least one panel has the size ratio specified by the weighting value relative to a second scaled size of another selected panel;
   resizing the at least one panel in the selected panels based on the first scaled size; and
   generating, by a computer system, the slide using the set of panels including the at least one resized panel; and
   sending the slide to the user device.

2. The method of claim 1, wherein the scaled size of each panel is determined at least in part based on the size of a parent group.

3. The method of claim 2, wherein the scaled size of each panel is further determined based on scaled sizes of the parent group and other panel groups having the same parent as the parent group.

4. The method of claim 1, wherein generating the slide comprises:
   calculating a first number representing panels that can be displayed horizontally, and a second number representing panels displayed vertically on the user device.

5. The method of claim 1, further comprising generating slides, such that each panel on the page is included in one slide.

6. The method of claim 1, further comprising:
   receiving, by the user device, one or more slides including the slide, each slide including at least one panel;
   displaying a first slide of the slides on the user device; and
   displaying a different slide of the slides on the user device in response to receiving a navigation action.

7. One or more non-transitory computer storage media encoded with computer program instructions that when executed by one or more computers cause the one or more computers to perform operations comprising:
creating a page including a plurality of panels and a layout of the plurality of panels in a development environment, the development environment enabling a developer to determine how content is presented to different computer devices by:
associating content with the plurality of panels;
receiving data representing a weighting value for at least one panel of the plurality of panels, the weighting value specifying a size ratio of the at least one panel relative to another panel of the plurality, the size ratio being independent of a size of a display of a user device; and
organizing the panels including the at least one panel and the associated content into a hierarchical layout that organizes the plurality of panels based on the weighting value associated with the at least one panel, the hierarchical layout indicative of an order for presentation of the panels groups and one or more types of navigation actions of a plurality of different navigation actions for navigating through the order of presentation of the panels;
receiving a request to provide the page to the user device;
selecting two or more panels to include in a slide based on the size of the display of the user device and the hierarchical layout, wherein the selected panels include less than all of the panels and the at least one panel;
determining a scaled size for each panel in the selected panels based on the weighting value of the at least one panel and the size of the display of the user device, wherein a first scaled size of the at least one panel has the size ratio specified by the weighting value relative to a second scaled size of another selected panel;
resizing the at least one panel in the selected panels based on the first scaled size; and
generating, by a computer system, the slide using the set of panels including the at least one resized panel; and sending the slide to the user device.

8. The one or more non-transitory computer storage media of claim 7, wherein the scaled size of each panel is determined at least in part based on the size of a parent group.

9. The one or more non-transitory computer storage media of claim 8, wherein the scaled size of each panel is further determined based on scaled sizes of the parent group and other panel groups having the same parent as the parent group.

10. The one or more non-transitory computer storage media of claim 7, wherein generating the slide comprises:
calculating a first number representing panels that can be displayed horizontally, and a second number representing panels displayed vertically on the user device.

11. The one or more non-transitory computer storage media of claim 7, wherein the operations further comprise generating slides, such that each panel on the page is included in one slide.

12. The one or more non-transitory computer storage media of claim 7, wherein the operations further comprise:
receiving, by the user device, one or more slides including the slide, each slide including at least one panel;
displaying a first slide of the slides on the user device; and
displaying a different slide of the slides on the user device in response to receiving a navigation action.

13. A system comprising:
one or more computers and one or more storage devices storing instructions that are operable, when executed by the one or more computers, to cause the one or more computers to perform operations comprising:
creating a page including a plurality of panels and a layout of the plurality of panels in a development environment, the development environment enabling a developer to determine how content is presented to different computer devices by:
associating content with the plurality of panels; and
receiving data representing a weighting value for at least one panel of the plurality of panels, the weighting value specifying a size ratio of the at least one panel with respect to another panel of the plurality, the size ratio being independent of a size of a display of a user device;
organizing the panels including the at least one panel and the associated content into a hierarchical layout that organizes the plurality of panels based on the weighting value associated with the at least one panel, the hierarchical layout indicative of an order for presentation of the panels and one or more types of navigation actions of a plurality of different navigation actions for navigating through the order of presentation of the panels;
receiving a request to provide the page to the user device;
selecting two or more panels to include in a slide based on the size of the display of the user device and the hierarchical layout, wherein the selected panels include less than all of the panels and the at least one panel;
determining a scaled size for each panel in the selected panels based on the weighting value of the at least one panel and the size of the display of the user device, wherein a first scaled size of the at least one panel has the size ratio specified by the weighting value relative to a second scaled size of another selected panel;
resizing the at least one panel in the selected panels based on the first scaled size; and
generating, by a computer system, the slide using the set of panels including the at least one resized panel; and sending the slide to the user device.

14. The system of claim 13, wherein the scaled size of each panel is determined at least in part based on the size of a parent group.

15. The system of claim 14, wherein the scaled size of each panel is further determined based on scaled sizes of the parent group and other panel groups having the same parent as the parent group.

16. The system of claim 13, wherein generating the slide comprises:
calculating a first number representing panels that can be displayed horizontally, and a second number representing panels displayed vertically on the user device.

17. The system of claim 13, wherein the operations further comprise generating slides, such that each panel on the page is included in one slide.

18. The system of claim 13, wherein the operations further comprise:
receiving, by the user device, one or more slides including the slide, each slide including at least one panel;
displaying a first slide of the slides on the user device; and
displaying a different slide of the slides on the user device in response to receiving a navigation action.

19. A computer-implemented method, the method comprising:

providing a development environment to a user, the development environment enabling the user to determine how content is presented to different computer devices by:
  associating content with the plurality of panels;
  receiving data representing a weighting value for at least one panel of the plurality of panels, the weighting value specifying a size ratio of the at least one panel with respect to another panel of the plurality, the size ratio being independent of a size of a display of a user device; and
  organizing the panels including the at least one panel and the associated content into a hierarchical layout that organizes the plurality of panels based on the weighting value associated with the at least one panel, the hierarchical layout indicative of an order for presentation of the panels and one or more types of navigation actions of a plurality of different navigation actions for navigating through the order of presentation of the panels;
  generating, based on interactions between the user and the development environment, a plurality of panels and the hierarchical layout, wherein the at least one panel and a second panel combine to form a slide based on the hierarchical layout, the weighting value of the at least one panel, and a number of pixels on the display of a user device requesting the slide, and wherein a first scaled size of the at least one panel has the size ratio specified by the weighting value relative to a second scaled size of the second panel.

20. The computer-implemented method of claim 19, wherein the development environment presents a generated slide to the user based on the size of a window presenting the development environment; and the user may simulate different screen sizes by altering the size of the window, thereby causing a second slide to be generated.

21. The computer-implemented method of claim 19, where the at least one panel and the second panel have a common parent in the hierarchical layout.

* * * * *

UNITED STATES PATENT AND TRADEMARK OFFICE
CERTIFICATE OF CORRECTION

PATENT NO. : 10,496,727 B1  
APPLICATION NO. : 15/233072  
DATED : December 3, 2019  
INVENTOR(S) : Thomas R. Kennedy, Jr.

Page 1 of 1

It is certified that error appears in the above-identified patent and that said Letters Patent is hereby corrected as shown below:

In the Claims

Column 19, Line 23, Claim 7, after "panels" delete "groups".

Signed and Sealed this
Twelfth Day of May, 2020

Andrei Iancu
*Director of the United States Patent and Trademark Office*